United States Patent [19]

Foster

[11] 4,229,794

[45] Oct. 21, 1980

[54] METHOD AND APPARATUS FOR SUPPLYING A LABEL PRINTER WITH PRODUCT INFORMATION

[75] Inventor: Colin E. Foster, Bensenville, Ill.

[73] Assignee: Sanitary Scale Company, Belvidere, Ill.

[21] Appl. No.: 900,328

[22] Filed: Apr. 26, 1978

[51] Int. Cl.³ .................. G06K 15/00; G06K 7/08; G01G 23/44
[52] U.S. Cl. .................................. 364/466; 177/4; 235/378; 235/432; 364/567
[58] Field of Search ............... 235/383, 376–379, 235/432; 364/466, 567; 177/3, 4, 25

[56] References Cited

U.S. PATENT DOCUMENTS

| | | | |
|---|---|---|---|
| 3,459,272 | 8/1969 | Susor | 177/4 |
| 3,528,089 | 9/1970 | Martin | 177/25 |
| 3,789,193 | 1/1974 | Bremner | 177/4 |
| 3,825,085 | 7/1974 | Martin | 177/3 |
| 3,947,660 | 3/1976 | Saito | 235/383 |
| 3,961,747 | 6/1976 | Small et al. | 235/383 |
| 3,962,569 | 6/1976 | Loshbough et al. | 364/466 |
| 3,989,929 | 11/1976 | Treiber | 235/432 |
| 4,029,161 | 6/1977 | Foster et al. | 364/466 |
| 4,102,420 | 7/1978 | Uyama et al. | 364/466 |
| 4,109,857 | 8/1978 | Teraoka et al. | 235/378 |
| 4,126,779 | 11/1978 | Towers et al. | 235/376 |

Primary Examiner—Felix D. Gruber
Attorney, Agent, or Firm—Cook, Wetzel & Egan, Ltd.

[57] ABSTRACT

Described herein is a method and apparatus for storing, on a product card, information relating to the description and the unit price of a product to be weighed, and for providing a label printer with the stored information as well as the total price of the product in a simple and reliable operation. Preferably, the invention makes use of a card reader for reading the information stored on the product card, a computer for storing the information and for calculating the total price of the weighed product. The information read from the product card and the total product price are transmitted to a label printer for printing thereof on a label. In its preferred form, the invention provides for the modification of the unit price information on the product card to reflect a manually set unit price.

8 Claims, 13 Drawing Figures

4,229,794

METHOD AND APPARATUS FOR SUPPLYING A LABEL PRINTER WITH PRODUCT INFORMATION

BACKGROUND OF THE INVENTION

This invention relates to systems and methods for calculating and printing on a label, weight, price and descriptive information of consumer products.

In establishments such as supermarkets, it has been the practice to pre-package and weigh certain random weight products such as meat, and to place a label on the packages. Typically, the label includes a description of the product, its net weight, its unit price per pound, and the total purchase price.

Recently, a uniform product code (U.P.C.) consisting of machine-readable indicia in the form of sequential stripes have been placed on the labels also. That code contains the product commodity number (a numerical designation of product description) as well as the cost of the product. Thus, when the product is presented at a checkout counter, the clerk need merely use a scanner to read out the encoded information. In response to the reading obtained by the scanner, the identity and cost of the item is noted and may be printed on a final sales receipt.

A problem associated with the weighing and labeling procedure described above is that the initial preparation of the product label has been time consuming and subject to error. Specifically, a human-readable description of the product for use on the label was typically printed by inserting embossed or molded slugs into a label printer for printing the product description. The U.P.C. number might be generated by inserting a metal key whose edge or edges are configured to reproduce the desired U.P.C. number. However, it has generally been the case that the U.P.C. code could not be printed on the label in the same operation or with the same printer in which the product description was printed. Thus, two printing operations were required or two labels were required, one for the human-readable product description and one for the U.P.C. code.

An additional problem involved the printing of the price information on the label. Where metal slugs were used for product description, those slugs might also contain manually pre-patterned holes for generation of the price information. By inserting such slugs, an operator could cause an optical scanner to detect the price information and cause the printer to print that information on the label.

Not only is the above-described method of price encoding tedious, but it becomes even more troublesome when the price of a product is changed, as for example when a product is the subject of a special sale price. To reflect the new price, the slug holes have to be rearranged manually, thereby providing new opportunities for error. Accordingly, prior methods and apparatus for pre-printing labels have proven to be less efficient and reliable than desired.

OBJECTS OF THE INVENTION

It is a general object of the invention to provide improved method and apparatus for supplying a label printer with product description and cost information for printing thereof on a label.

It is a more specific object of the invention to provide a method and apparatus for supplying a label printer with product description and product cost information in one simple operation.

It is a further object of the invention to provide a method and apparatus by which product unit cost is easily changed, and to further provide for printing of product descriptions, unit cost, total cost, U.P.C. code, or other information on a label in a simpler and more reliable manner.

BRIEF DESCRIPTION OF THE DRAWINGS

The above and other objects of the invention are more particularly set forth in the following detailed description and in the accompanying drawings of which.

SUMMARY OF THE INVENTION

According to the invention, a method and apparatus are disclosed for storing information relating to product description and unit price on a product card and for providing a label printer with the stored information as well as the total price of a weighed object in a simple, and reliable operation. Preferably, product description, unit price information and a U.P.C. code description of the product are magnetically encoded on a product card. The information stored on the product card is automatically read by a card reader, the product is weighed, and a computer calculates the total price of the weighed product. The information stored on the product card and the calculated product price is transmitted to a label printer for printing thereof on a label. In addition, means are preferably included for altering the unit price information on the product card to reflect a manually set unit price.

According to one aspect of the invention, a partial check digit whose value is a function of the U.P.C. code product description is also stored on the product card. Using that partial check digit, the computer generates a final check digit whose value is a function of the calculated product price and the partial check digit, and also generates a further U.P.C. code representative of the calculated product price. The read and calculated U.P.C. code and at least the final check digit are transmitted to the label printer for printing in machine-readable form.

DESCRIPTION OF THE PREFERRED EMBODIMENT

Figure 1:
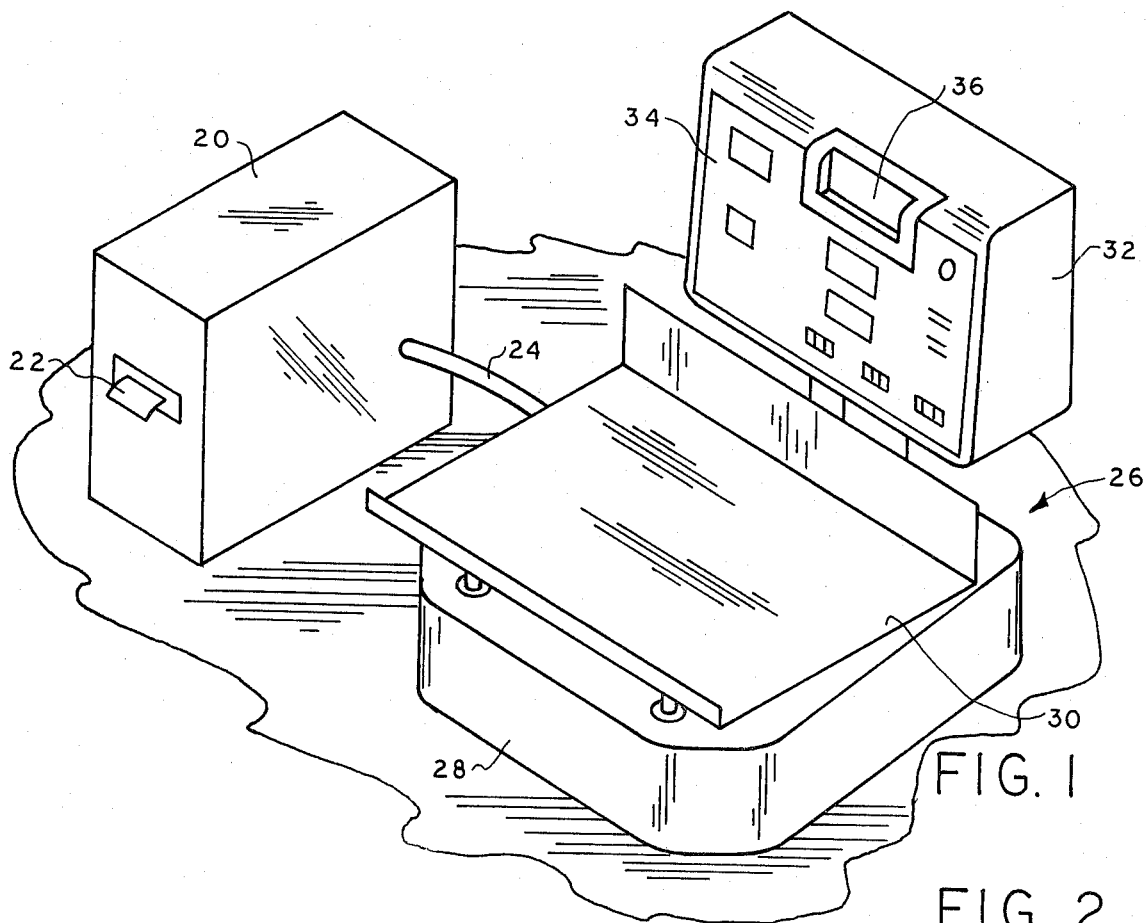
FIG. 1 is a perspective view of a label printer and a scale embodying various aspects of the invention.

Referring now to FIG. 1, there is shown a system which, very briefly, is for weighing products and for printing a label bearing product description, product cost, and other information. Generally, the label is affixed to a container in which the product is sold.

The features of the FIG. 1 system to which this invention is directed include the method and apparatus by which the information concerning product cost, product description, etc. are stored and transmitted to a label printer, such as printer 20 of FIG. 1. The label printer 20 prints product cost, product description, and other information on a label 22 in response to signals received via a cable 24.

The signals which are transmitted to the label printer 20 via the cable 20 are developed by a scale 26. The major components of the scale 26 include a base 28, a platter 30 for receiving a product to be weighed, and a control box 32. The latter includes electronic circuitry for reading and encoding a product card (to be described) hereinafter) and for generating signals for transmission to the label printer 20. The control box 32 may also include electronic circuits associated with developing product weight and tare weight signals, or that circuitry may be included within the base 28.

Figure 2:
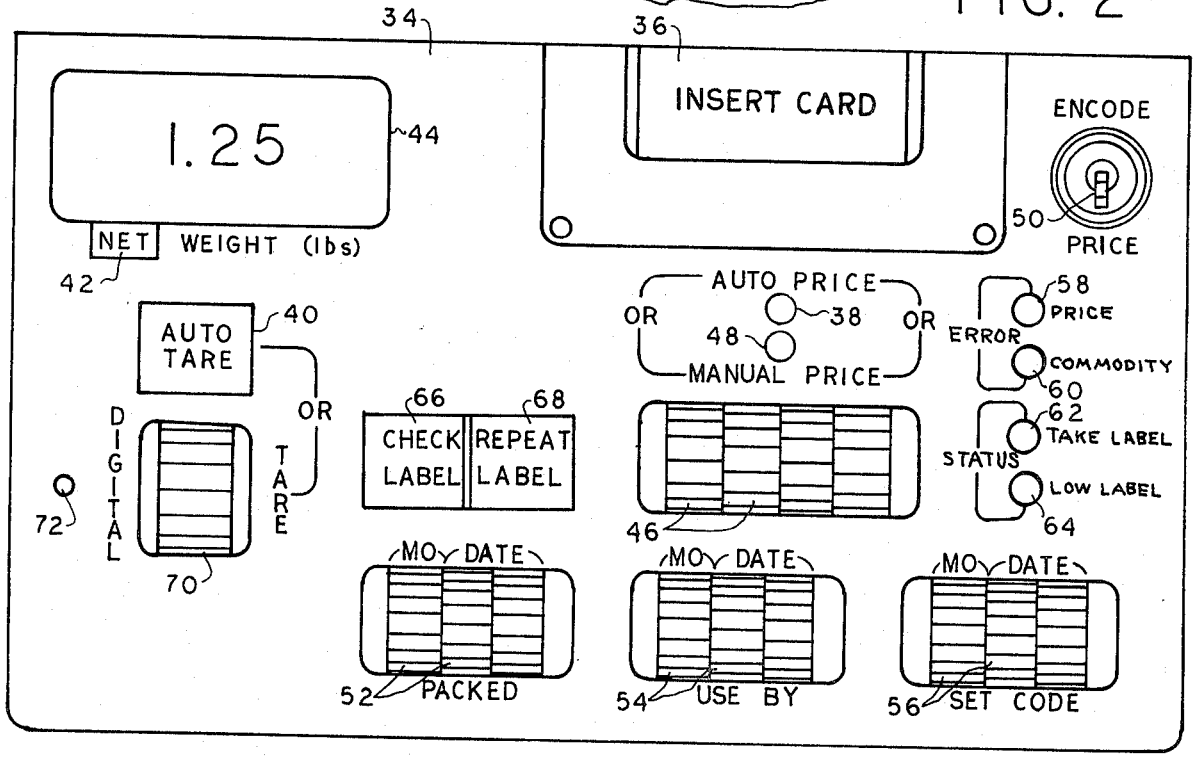
FIG. 2 is a view of the front panel of the scale shown in FIG. 1.

The control box 32 has a front panel 34 which includes a number of switches, indicators and the like which are shown very schematically in FIG. 1. A detailed view of the front panel 34 is shown in FIG. 2 and is used to briefly describe the functions effected by the scale 26.

Figure 4:
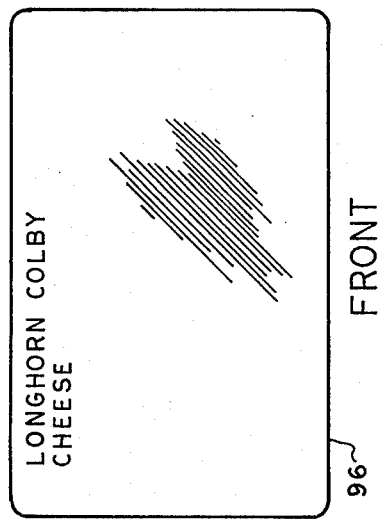
FIG. 4 illustrates a front view and a back view of a product card for use with the invention.

As shown, the front panel 34 includes a receptacle 36 into which a product card is inserted. The card itself may be of the size of conventional credit cards and has magnetically coded information thereon which is decoded or "read" by a card reader in the control box 32. An exemplary product card is shown in FIG. 4 and is described in more detail hereinafter.

Typically, the information on the product card includes a description of the product to be weighed, its unit price per pound, and preferably other information described below. At this juncture, it is sufficient to describe the operation of the scale 26 only in terms of the information relating to product description and unit price information encoded on the product card.

Referring again to FIG. 2, an operator may elect to use the scale 26 in an "auto price" mode or a "manual price" mode. Assuming that the "auto price" mode is selected, the operator need merely insert the product card into the receptacle 36, whereupon an "auto price" light 38 is energized.

The operator also determines whether to use the scale 26 in an "auto tare" mode or a "digital tare" mode. If auto tare is selected, the operator places the product container on the platter 30, depresses the auto tare button 40, then places the product itself on the platter 30, and the scale electronics computes the net weight of the product. Thereafter, if products using an identical container are used, subsequent weighing operations may be done merely by placing the product and its container on the scale. The scale electronics automatically subtracts the previously determined weight of the product container from the gross weight on the scale to compute the net weight of the product.

When the scale electronics have computed the net weight of a product on the platter 30, a net weight light 42 is automatically lit and the net weight of the product is shown on a weight indicator 44, the latter of which may comprise a number of conventional seven-segment, light-emissive numerals.

With the net product weight calculated and the unit price of the product having been "read" from a product card inserted in the receptacle 36, the scale 26 multiplies the unit price of the product times the net weight of the product and transmits a corresponding product price signal to the printer 20. The latter then prints the total price of the product on the label 22. In addition, the printer 20 receives signals via the cable 24 for printing a humanreadable description of the product, as well as other information described in more detail below.

Frequently, the unit price of a product must be changed to reflect a sales price or the like. To enable the scale 26 to compute a total product price in accordance with a new unit price, the scale 26 includes means for overriding the unit price information on the product card. Toward this end, there is included a number of manual price thumbwheel switches 46. Whenever the switches 46 are set to a price other than zero, the scale 26 assumes that a manual unit price is being set, whereupon the auto price light 38 is extinguished and a manual price light 48 is energized. The scale 26 then computes total product price in accordance with the manually set unit price and actuates the priner 20 to print that total price.

According to one aspect of the invention, the new unit price need not be repeatedly set manually by the switches 46, nor must a new product card by obtained with the updated unit price encoded thereon. Rather, with a new unit price set by the switches 46, an operator inserts a key into a lock 50 and turns the key, whereupon the "old" unit price information encoded on the product card in the receptacle 36 is replaced by the "new" unit price as set by the switches 46. Thus, any product card can be updated with new unit price information with minimum effort. The way in which such updating of a product card is effected is described hereinafter.

Referring again to FIG. 2, the front panel 34 may also include thumbwheel switches 52 for manually entering the date on which the product was packed. That information may also be transmitted to the printer 20 for printing on a label.

Front panel switches 54 and 56 provide means for manually entering a "use by" date and a "set code", respectively, also for printing on a label. The "set code" entry may identify, for example, a store departmental code.

The front panel may also include error and status indicator lights as shown. When a unit price or product description has not been properly read from a product card, error lights 58 or 60 are energized. Lights 62 and 64, when energized, indicate, respectively, that a previously printed label has not been removed from the printer 20 and that the printer 20 has a low supply of label paper.

In order to verify that the scale 26 is operating properly, a "check label" button 66 is provided. When this button is depressed, the scale 26 causes the printer 20 to print out a label having all the information as read from a product card or received as an input from the front panel switches, Thus, verification of the proper operating condition of the scale and the printer is possible.

In order to print a number of labels for packages containing identical products whose weights are also identical, a "repeat label" button 68 may be provided. When the button 68 is depressed, successive labels containing the same information are printed until the button 68 is released. Thus, only the first of a number of identical products need be weighed, and yet a label is quickly provided for each such product. Preferably, all the manually actuatable buttons on the front panel become illuminated when pressed.

It was pointed out above that the scale 26 could be operated in either an "auto" tare mode or a "digital" tare mode. The latter mode may be used when the operator knows the tare weight of a product, i.e., knows the weight of the container for the product. When the tare weight is known, the operator may enter the known tare weight by means of a thumbwheel switch 70, whereupon a light 72 is automatically energized to alert the operator to the fact that the scale 26 is in the "digital" tare mode.

Figure 3:
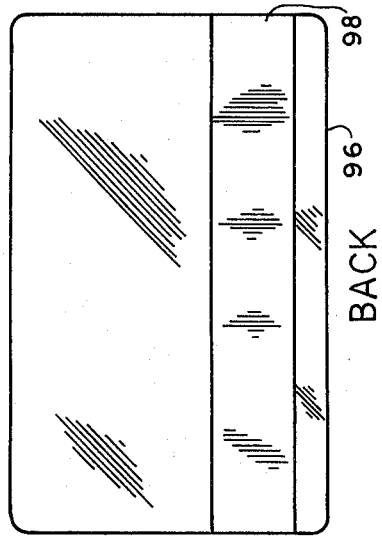
FIG. 3 illustrates a typical label imprinted with information according to the invention.

Turning now to FIG. 3, there is shown a label 74 bearing imprinted information, some of which is developed as a result of the scale 26 having read the encoded information on a product card. Specifically, the label 74 includes a human-readable product description 76, unit price information 78, net weight information 80, and total product price information 82. The label 74 may also include packing date information 84, set code information 86, used-by-date information 88, a product code 90, and a U.P.C. code 92. As shown, the U.P.C. code is printed in the standard machine-readable format as well as in human-readable format at 94. The "price-per-pound", "net weight pound", and "total" legends may be printed in response to information stored in a memory in the printer itself. Such a printer is preferably of the type identified as Model RW 501, available from 3 M corporation. In the description which follows hereinafter, it is assumed that the label printer 20 is of that type.

It will be appreciated that one of the advantages of the invention described herein is that both the human-readable and the machine-readable information contained on the label 74 are printed in a single operation by a single printer. That is, a product card encoded with the appropriate information need merely be inserted in the receptacle 36 (FIG. 2), the product placed on the platter 30, and the scale 26 will automatically actuate the printer 20 for printing the information appearing on the label 74. No further manipulation by the operator is required, other than actuating any of the switches on the front panel 34, as desired.

A preferred form of product card for insertion in the receptacle 36 is shown in FIG. 4. In the illustrated embodiment, the product card 96 has the same general physical dimensions as a conventional credit card, and may be made of the same plastic material as is conventionally used in the production of credit cards. As shown, the front of the product card 96 includes a human-readable designation of the product description to enable an operator to select the appropriate product card. Preferably the product description is embossed on the card 96.

The backside of the product card 96 includes an encoding stripe 98, preferably of the type on which machine-readable information may be magnetically encoded. Such magnetic encoding is well known in the art and is not described in detail herein. For example, however, the information magnetically encoded on the stripe 98 may be encoded thereon by a type of apparatus presently used to encode information on magnetic strips of conventional credit cards. An example of such apparatus is the model A50ER "Encoder Reader" manufactured by Elcon Industries, Inc., of St. Louis, Mo.

Figure 5:
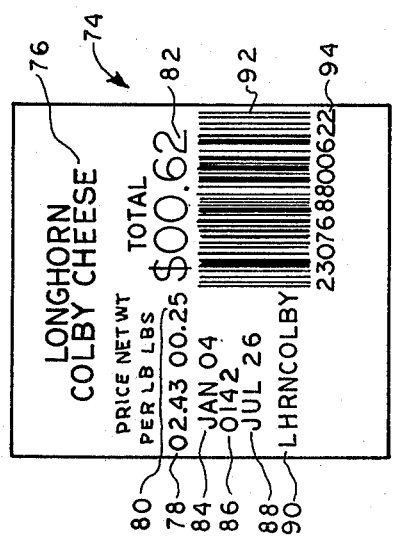
FIG. 5 graphically illustrates information which is magnetically coded on the back side of the product card.

The information which is encoded on the stripe 98 may assume a number of formats, a preferred one of which is illustrated in FIG. 5. As shown, the magnetic stripe 98 includes a pair of magnetically encoded tracks, identified as track 1 and track 2. In reading the information on the stripe 98, track 1 is first read from left to right as indicated in FIG. 5, and the remaining information is read from track 2 from right to left. Referring first to track 1, this track may begin with a guard zone 100 in which no information is encoded. Following the guard zone 100, a start character 102 is encoded to indicate to the machine which is reading the stripe 98 (i.e., a card reader) that the information which follows the start character 102 is to be read. The start character 102 and all other characters encoded on the stripe 98 are conveniently in the conventional A.S.C.I.I. code.

The next information to be read is a product code 104. This code contains the information which is ultimately printed on the lable 74 at 90 and is typically an abbreviated product description. Following the product code 104, the product description 106 is encoded, which contains the information which is printed in human-readable form at 76 on the lable 74. An end character 108 following the product description indicates to the card reader that no further information to be read is contained in track 1. A guard zone 110 may be included at the end of track 1.

The reading of track 2 begins at the right, as viewed in FIG. 5, and starts with a guard zone or blank portion 114, followed by a start character 116. The latter indicates to the card reader that information to be read on track 2 is to follow.

A further product description 118 follows the start character 116. The product description 118 may be but a continuation of the product description 106 begun on track 1. It may frequently be the case that the total product description is too long to be included at 106 in track 1; therefore, the additional description may be encoded at 118 on track 2.

The next bit of information is a U.P.C. code 120 which is the code which corresponds to the product description encoded at 106 and 118. When printed, the code 120 will appear in machine-readable format as indicated at 92 in FIG. 3. It should be noted that the U.P.C. code 120 does not include all the information which will be printed at 92 on the label 74, but just the first six digits thereof which describe the product. The remainder of the U.P.C. code to be printed at 92 includes the U.P.C. code corresponding to the price of the product ad at least one check digit, to be described hereinafter. The U.P.C. code which contains the price information and the check digit are all developed by the scale of 26 from information derived from the data read from the magnetic stripe 98 and from the determined weight of the product. The check digit, the last digit in the U.P.C. code 92, has a value which is a function of all the preceeding digits appearing in the U.P.C. code 92 and is imprinted on the label 74 so that an operator can pass a scanner across the U.P.C. code 92 to read the code, develop its own check digit as a result of reading the code, and compare its own generated check digit against the digit 92. If the two check digits correspond, this is an indication that the scanner has accurately read the code 92. If the two check digits do not correspond, the scanner indicates to the operator that the code was read incorrectly.

Referring again to FIG. 5, an end data character 122 follows the U.P.C. code 120 to indicate to the reader that the end of the fixed data has occurred.

The next data which appears is a partial check sum digit 124. This partial check sum digit 124 has a value which reflects the product description encoded at 106 and 118. In a manner to be described hereinafter, the scale 26 uses the partial check sum digit 124 to calculate the final check digit which is printed on the label 74.

Following the partial check sum digit 124 there is a guard band 126 which includes no encoded information, followed by a price start character 128. The latter character indicates to the card reader that the information to follow relates to the unit price or price per pound of the product described at 106 and 118.

The next information encoded on track 2 is the unit price or price per pound information 130. This information represents the price per pound of the product which is described at 106 and/or 118 and, as described below, may be changed to reflect a new unit price for the product associated with this particular product card.

Following the unit price information 130, a price end character 132 is encoded to indicate the end of the pricing information at 130. By bracketing the price per pound information 130 by a price start character 128 and a price end character 132, a card reader can precisely locate the price per pound information in order to erase that information and update it with new unit price information. At the end of track 2 a guard zone or blank space 134 may also be included.

The method and apparatus by which a label printer is provided with information for printing the product description, cost, and other information will now be described generally with reference to FIG. 6. As shown in that figure, a computer 136 interfaces with a control panel 138, a card reader 140, a label printer 20, and a scale weighing mechanism 144. All these elements except for the printer 20 are a part of what has been referred to generally as the scale 26.

The control panel 138 includes the electronics associated with the various switches, indicators, etc., shown on the front panel 34 (FIG. 2). The card reader 140 is a device for automatically reading magnetically coded information on the product card 96 and for writing new unit price information thereon and is physically located in the control box 32. The card reader 140 may be of the series CR31 type manufactured by Vertel Corp. of Wellesley Hills, Mass.

The printer 20 is preferably of the type referred to above and shown in FIG. 2. The scale weighing mechanism 144 represents apparatus for generating net weight information in response to the weighing of a product and is preferably of the type described in U.S. Pat. No. 4,029,161 and assigned to the assignee of this invention.

In operation, the control panel 138 supplies to the computer 136 via lead 146, signals indicating the setting of the manual price switches 46, the set code switches 56, the auto and digital tare switches 40 and 70, and the remaining switches and buttons located on the front panel 34. On lead 148, the computer 136 supplies signals to the control panel 138 for energizing the weight indicator 44, the various lamps on the front panel 34, and the illuminating switches.

The scale weighing mechanism 144 provides the computer 136 via lead 150 with signals representative of the weight of the product being weighed.

The card reader 140 includes a bi-directional motor for moving a write head across the magnetic stripe 98. The head preferably includes two sensors, one for each of the tracks shown in FIG. 5. In addition, a pair of switches are included in the card reader 140 for sensing when a product card has been inserted into the receptacle 36.

To start the card reader 140, the computer 136 sends a start signal on a lead 152 for actuating the card reader's motor to drive its head across the magnetic stripe 98. Lead 152 also carries signals which enable the card reader 140 to encode new unit price information on the magnetic stripe.

As the card reader scans the magnetic stripe, the information encoded thereon is fed to the computer 136 via lead 154 for storage thereof in a memory and for transmission to the printer 142 via lead 156. Lead 156 also provides the printer with computed product price, the computed final check digit, and the portion of the U.P.C. code which reflects the price of the product. On lead 158, the printer 142 supplies the computer 136 with information relating to the operational status of the printer 142, i.e., whether the printer is off or on, ready to print, out of paper, etc.

Figure 6:
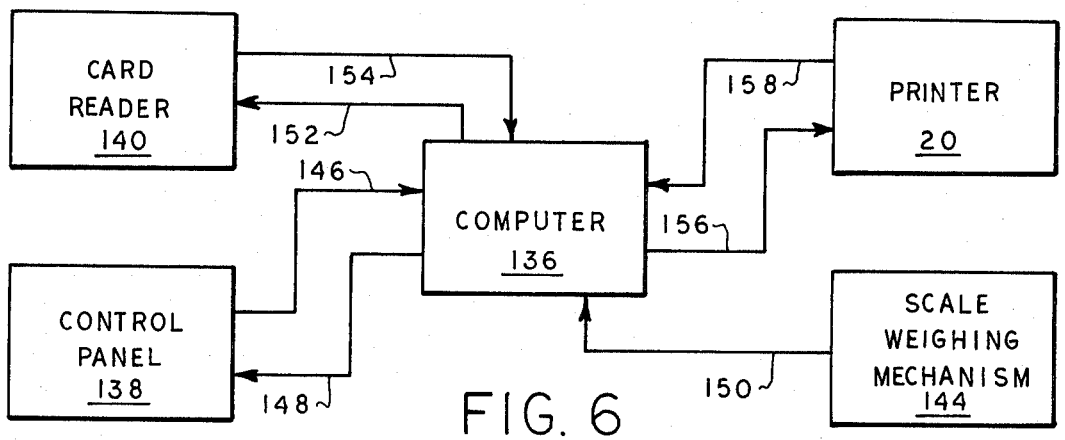
FIG. 6 is a general schematic diagram of a label encoding system embodied in the apparatus shown in FIG. 1.

In the operation of the structure shown in FIG. 6, the card reader 140 reads from the product card 96 the magnetically encoded product description information at 106 and 118 on tracks 1 and 2 (FIG. 5), the encoded unit price information at 130, the U.P.C. code at 120, and the partial check sum digit at 124. The computer 136 stores this machine-read information in a memory and, upon receiving from the scale 144 the weight of the product, the computer 136 automatically multiplies the weight of the product times the unit price information stored in the memory to obtain the total product price. Computer 136 transmits to the printer 142 the product description information and the total product price for printing that information on a label in human-readable form as shown in FIG. 3. The computer 136 also transmits the product code information, i.e., the U.P.C. code, to the printer 142 for printing thereof in machine-readable form.

In response to the reading of the partial check sum digit at 124 and the calculation of the total product price, the computer 136 calculates a final check digit as a function of the total product price. This final check digit is transmitted to the printer 20 via lead 156 and is imprinted on a label in machine-readable format as shown at 92 in FIG. 3 and in human-readable format as shown at 94 in FIG. 3. Alternately, where a partial check digit is not encoded on the magnetic stripe 98, the computer 136 may calculate the final check digit as a function of the total product price and the product description read from the magnetic stripe. However, the encoding of a partial check digit on the magnetic stripe permits the use of less memory storage in the computer 136 and is, therefore, the more desirable mode of operation.

In the event that it is desired to calculate the product price based on a unit price other than that encoded on the product card, an operator merely sets a new unit price by the front panel switches 46, whereupon the computer 136 calculates product price in accordance with the manually set unit price. Thus, the encoded unit price is overridden.

Should it be desired to have all subsequent product prices automatically calculated in accordance with the new unit price, the operator inserts a key into the encode price switch 50 and turns the key. The computer 136 then causes the card reader 140 to scan the product card to locate the old encoded unit price. Upon finding the old unit price, the card reader 140 erases the old unit price and magnetically encodes at the unit price location the new unit product price which was manually set by the switches 46. In this manner, the product card 96 may be re-encoded each time the unit price of a product is changed.

Figure 7:
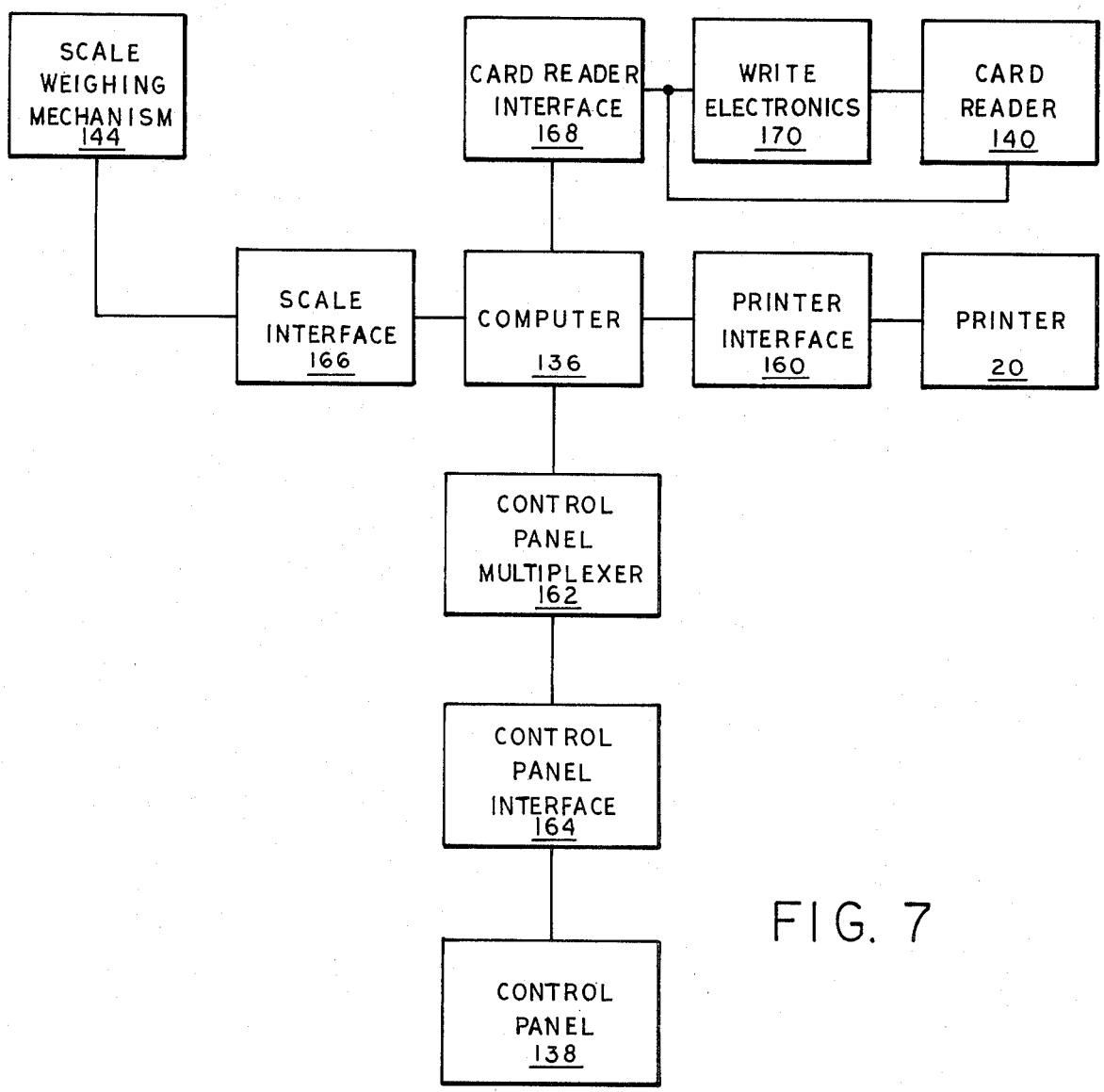
FIG. 7 is a more detailed block diagram of the system shown in FIG. 6.

To facilitate a more detailed description of the operation of the invention, and particularly of certain interface electronics by which the computer 136 controls the operation of the other components, a more detailed block diagram is shown in FIG. 7. In the latter figure, elements which correspond to the same elements in FIG. 6 have been given corresponding reference numerals. Also, additional blocks have been included to represent interfacing circuitry not shown in FIG. 6.

Each of the additional blocks illustrated in FIG. 7 will be briefly described in terms of its function, after which a more detailed description of its construction will be given.

Coupled between the computer 136 and the printer 20 is a printer interface 160 which transmits to the printer 20 data as well as control signals for operating the printer. In addition, the printer interface 150 provides electrical isolation of the computer 136 from the printer 20 so that any electrical noise associated with the printer 20 is not coupled back to the computer 136.

A control panel multiplexer 162 serves to transmit data between the computer 136 and the control panel 138. Specifically, when the computer 136 requires information from a particular switch on the control panel 138, it sends the address of that switch to the control panel multiplexer 162 which then interrogates the status of the desired switch in the control panel 138 and sends that information back to the computer 136.

The control panel interface 164 includes drivers for the lamps on the front panel 34 and provides interconnection between the switches, lamps and indicators on the front panel and the control panel multiplexer 162.

Disposed between the computer 136 and the scale weighing mechanism 144 is a scale interface 166. Briefly, the scale interface 166 includes a means for selecting a specific digit of data (weight) from the scale 144 to be supplied to the computer 136. Within the scale 144 is logic circuitry for converting scale movement into weight data. The connections between the internal logic of scale weighing mechanism 144 and the scale interface 166 are described briefly hereinafter.

Also coupled to the computer 136 is a card reader interface 168 controlling the transmission of data between the computer 136 and the card reader 140. Among its functions, it controls which track is being read or written by the card reader 140, controls the starting position of the card reader 140, and provides other functions which are described in more detail hereinafter.

A write electronics block 170 feeds information from the card reader interface 168 to the card reader 140 and actuates the card reader 140 for reading or writing on one of the tracks of the product card. The general function of the interfacing electronics shown in FIG. 7 as well as other functions not mentioned will now be described with reference to preferred circuitry for each of the blocks illustrated in FIG. 7.

Figure 8:
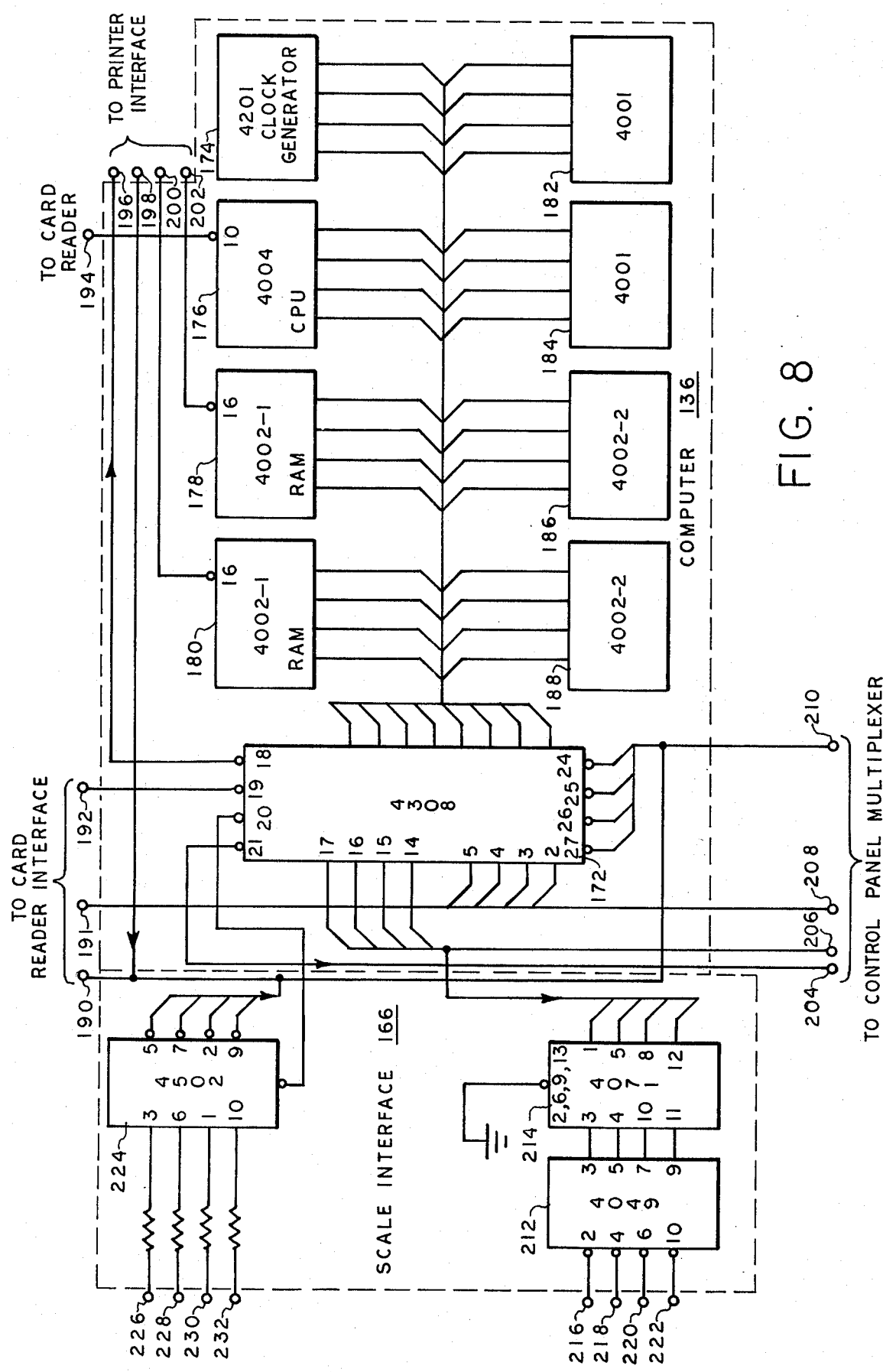
FIG. 8 is an exemplary circuit diagram of the computer and scale interface illustrated in FIG. 7.

Referring to FIG. 8, there is shown a functional wiring diagram of the computer 136 and the scale interface 166. In this and the succeeding figures, commercial identifying numbers as well as certain pin numbers are included on the various integrated circuit chips. Referring first to the computer 136, it includes a microcomputer chip 172 which may be an MCS 40 series chip available from Intel Corporation. Coupled to the chip 172 is a clock generator 174, a central processing unit 176, a pair of random access memory chips 178 and 180, and integrated circuit chips 182, 184, 186 and 188. Although the clock and power lines are not shown for the computer 146, it will be understood that they are connected among the various integrated circuit chips in the conventional manner. Programming of the computer 136 may be achieved by conventional programming apparatus according to the listing set forth at the end of the description.

The computer 136 includes input-output terminals 190, 191 and 192 coupled to the card reader interface 168, terminal 194 coupled to the card reader 140, terminals 196, 198, 200 and 202 coupled to the printer interface 160, and terminals 204, 206, 208 and 210 coupled to the control panel multiplexer 162. The functions achieved by the interconnections between the computer 136 and the other circuitry to which it is connected are set forth below in the description of that other circuitry.

The scale interface 166 includes drivers 212 and 214 which, when actuated by the microcomputer chip 72, drive the scale weighing mechanism 144 so as to select specific digits of the data (weight) from the scale. The terminals 216, 218, 220 and 222 are connected to logic internal to the scale weighing mechanism 144 for selecting the addresses of the desired digits.

A transmission gate 224 receives the selected digits from the scale 144 via terminals 226, 228, 230 and 232 and transmits those digits to the microcomputer chip 172.

As indicated above, the scale weighing mechanism 144 is preferably of the type described in U.S. Pat. No. 4,029,161, the teachings of which are incorporated herein by reference. Alluding briefly to the '161 patent, FIG. 5 thereof illustrates circuitry which receives incremental up and down pulses at terminals 90 and 91 indicative of the movement of the scale platter. These pulses are decoded by the logic circuitry in that FIG. 5 and the decoded information is fed to an up/down counter shown in FIG. 6 of the '161 patent to monitor the weight of the scale platter.

The outputs of the up/down counter are latched in latches 290–293 (FIG. 7 of the '161 patent) and fed through gates to output leads 210–213. The information on leads 210–213 is in the form of binary coded decimal signals representative of the weight of the scale platter. Leads 210–213 may be coupled to terminals 226–236 of the scale interface 166 shown herein in FIG. 8.

To address the scale, terminals 216–222 of the scale interface may be coupled to terminals 230–232, shown in FIG. 8 of the '161 patent. When so connected, leads 235–250 shown in FIG. 8 and the circuitry shown in FIG. 9, both of the '161 application, are not used.

Figure 9:
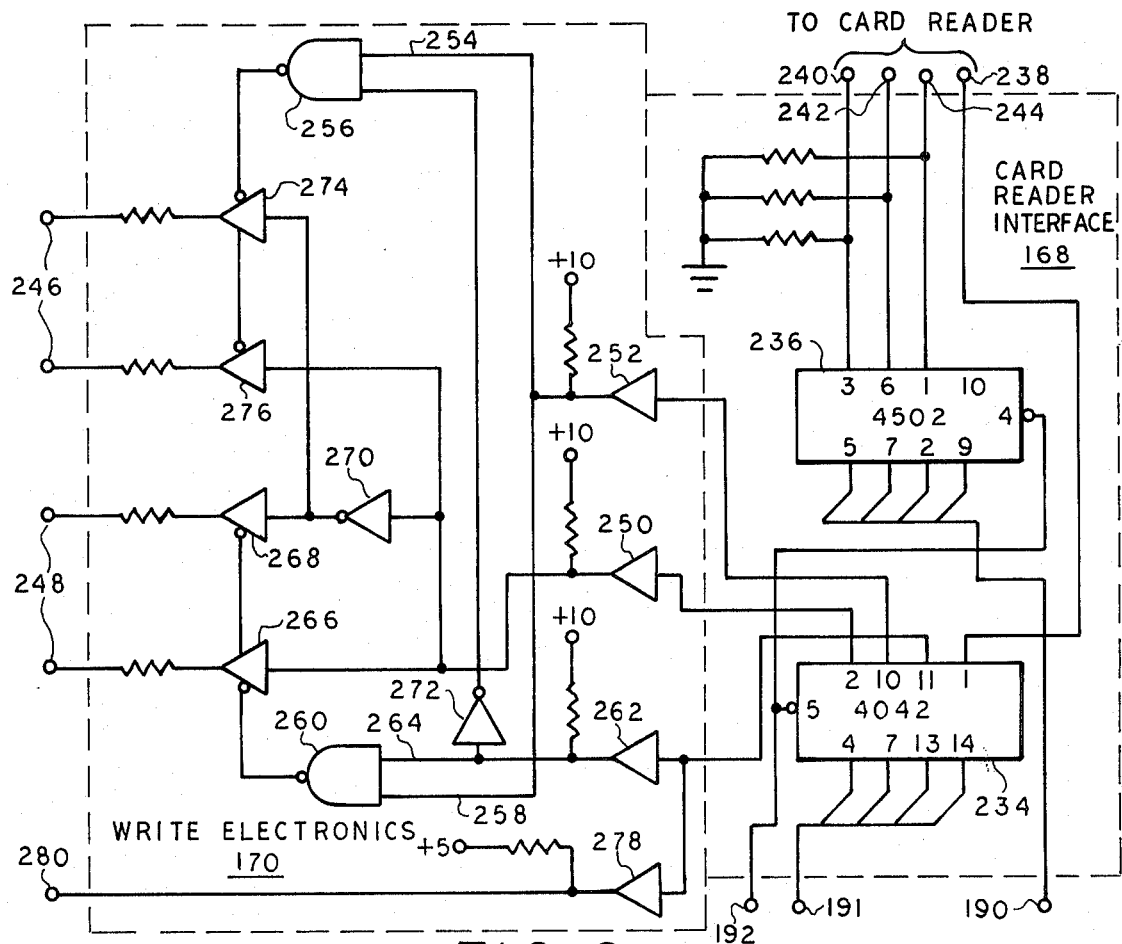
FIG. 9 is an exemplary circuit diagram of the card reader interface and write electronics illustrated in FIG. 7.

Referring now to FIG. 9 herein, detailed circuit diagrams of the card reader interface 168 and the write electronics 170 are shown. The card reader interface 168 includes integrated circuits 234 and 236, the former of which acts as an output driver providing control signals and serial data to the write electronics 170 and the card reader 140. In response to the signals received at its input terminals 191 and 192, the driver 234 provides at its pin 2, new unit price data in serial binary form to be recorded on the product card 96. Pin 10 of the driver 234 provides a high or low signal to indicate to the card reader 140 whether it is to be in the read or write mode. Pin 11 of the driver 234 provides a high or low signal to control which track on the product card 96 the card reader 140 is to scan, and pin 1 provides an on/off signal for the card reader motor at terminal 238.

In response to signals from the computer 136 at terminal 192, the transmission gate 236 transmits information from the card reader 140 to the computer via terminal 190. Specifically, the transmission gate receives serial data read by the card reader from terminal 240, an indication at terminal 242 of whether or not the reader head is at the starting end of a track and, from terminal 244, a signal indicative of the presence or absence of a product card in receptacle 36. All this information is fed to the computer 136 via terminal 190.

As noted above, the card reader 140 has a single head with a pair of sensors, one for each track. Each sensor includes a coil which, when energized by the write electronics 170, writes information related to unit price on a selected track of the product card 90. To enable the appropriate sensor in the card reader 140, the write electronics 170 provides serial binary data to be written or encoded at output pair terminals 246 or 248. When track 1, for example, is to receive data to be recorded, the data is received at a gate 250 and transmitted to one sensor coil via terminals 246. When the other track is to receive data to be recorded, the data received at the gate 250 is coupled to terminals 248.

More specifically, a gate 252 receives a high level signal from the card reader interface 168 when the card reader 140 is to be put in the write or encode mode and a low level signal when the card reader 140 is to be put in the read mode. Assuming a high level signal is received, the gate 252 provides a high level signal to an input 254 of a Nand gate 256 and to an input 258 of another Nand gate 260. Assuming that the card reader sensor associated with terminals 248 is to receive data, a gate 262 receives a high level signal from the card reader interface 168, whereupon the gate 262 provides a high level signal to an input 264 of the Nand gate 260. Consequently, the Nand gate 260 is enabled and responds by opening transmission gates 266 and 268.

Data received by the gate 250 now passes through the transmission gate 266 to one end of a sensor coil and through transmission gate 268 via an inverter 270 to the other end of the same sensor coil. Thus the sensor coil associated with terminals 248 is driven in push-pull.

The same high level input which causes the gate 262 to open transmission gates 266 and 268 also causes an inverter 272 to disable the Nand gate 256, whereby transmission gates 274 and 276 are closed. Consequently, the terminals 246 receive no data.

To record data on the track associated with terminals 246, a low level signal is sent to the gate 262, whereupon transmission gates 266 and 268 are closed, transmission gates 274 and 276 are opened, and the data received by the gate 250 is passed through transmission gates 274 and 276.

The write electronics 170 also includes a gate 278 which receives the high or low signals sent to the data 262. In response to a high level signal, the gate 278 provides a high level signal at a terminal 280 to cause the card reader to scan one of the tracks on the product card. A low level signal received by the gate 278 provides a low level signal at the terminal 280 for scanning the other track.

Figure 10:
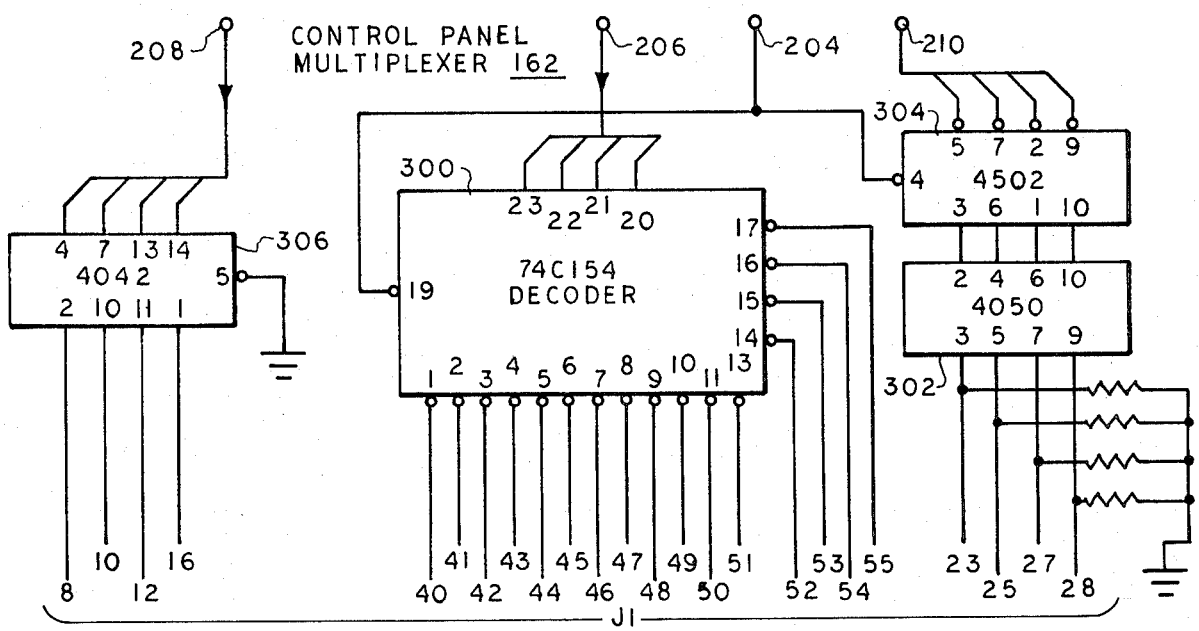
FIG. 10 is an exemplary circuit diagram of the control panel multiplexer illustrated in FIG. 7.

Referring now to FIG. 10, the control panel multiplexer 162 is shown in circuit form. Included is a decoder 300, a level shifter 302, a transmission gate 304, and a driver 306. When the computer 136 needs information concerning the status of the switches on the front panel, the address of that switch is sent to the decoder 300 via terminal 206 and a command pulse on terminal 204. In response, the decoder 300 selects the one of its sixteen output terminals 40-55 of J1 (Jack 1) which corresponds to that address in order to strobe the desired switch. For example, terminal 40 of J1 is used to determine whether the encode price switch 50 is closed, terminals 45-47 of J1 may strobe the set code thumbwheel switches 56, etc. The way in which the computer responds to the closing of the encode price switch 50 is described in detail hereinafter.

The switch which is strobed puts its status signals on terminals coupled to the control panel interface 164 and from there they are sent to pins 23, 25, 27 and 28 of J1 in the control panel multiplexer 162. The level shifter 302 receives the signals at the terminals 23-28 and inputs them in a level shifted form to the transmission gate 304. Upon command from the computer via a signal at terminal 204, the transmission gate 304 inputs those signals to the computer via terminal 210.

The driver 306 receives data concerning the weight of a product via terminal 208 from the computer for driving a seven segment type numeric display in the weight indicator 44 (FIG. 2), the latter of which may be of the type SM-800 Series, manufactured by Beckman Instruments, Inc. of Scottsdale, Arizona. Numerical data in binary form appears at pins 8, 10, 12 and 16 of J1 and is strobed into latches in the control panel interface 164 by signals on terminals 48-53 of J1.

Figure 11:
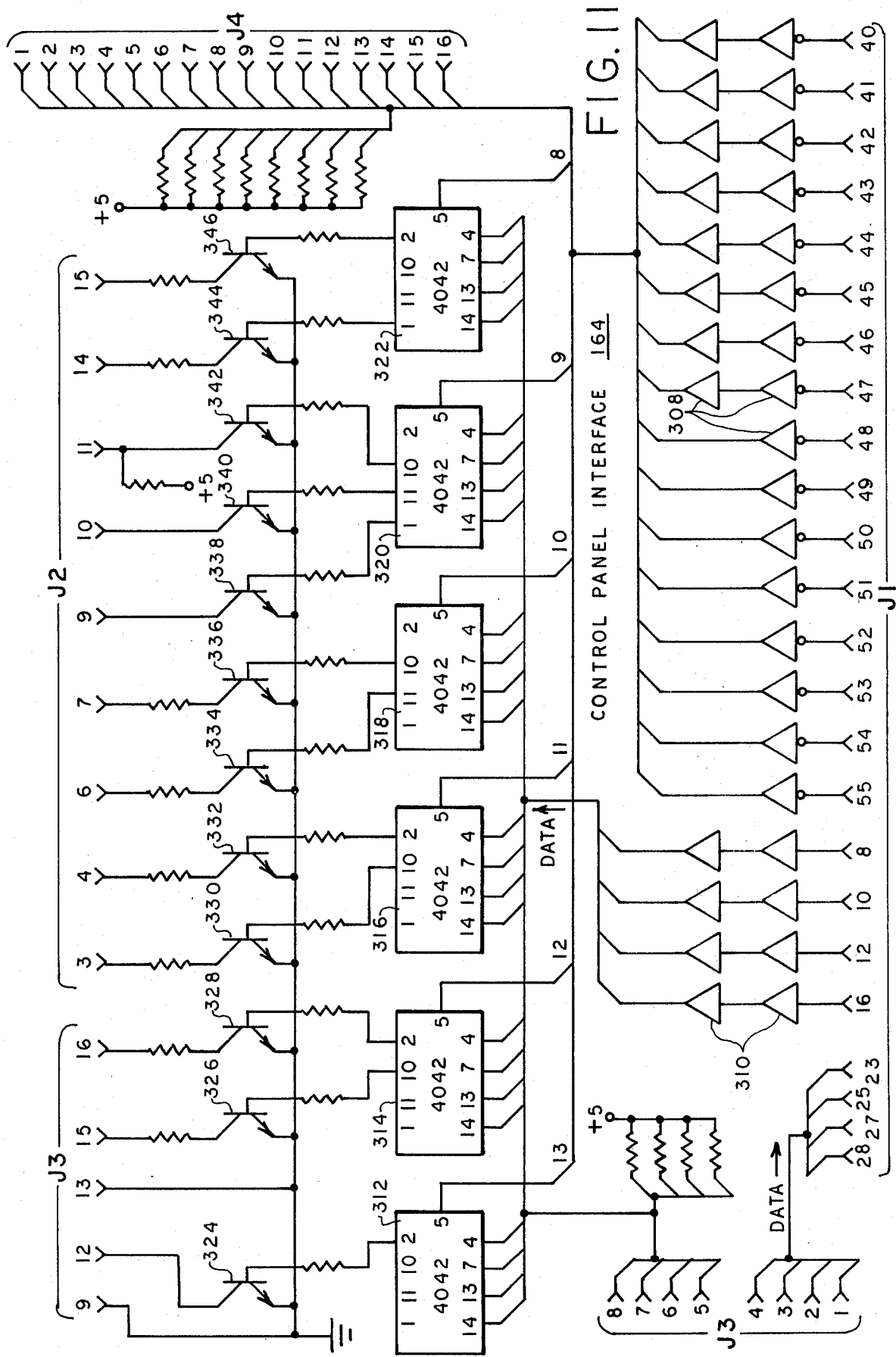
FIG. 11 is an exemplary circuit diagram of the control panel interface illustrated in FIG. 7.

The control panel interface 164 is shown in circuit form in FIG. 11. Its basic function is to provide means for interconnecting the control panel multiplexer 162 with the lights and switches on the front panel 34. Specifically, the various front panel switches are addressed by signals received at terminals 40-55 of J1 from the control panel multiplexer 164. The gates or drivers 308 connected to pins 40-55 of J1 pass the signals to terminals 1-16 of J4 for sampling the status of the switches. Signals representative of the status of an addressed switch are received at terminals 1-4 of J3, coupled to terminals 23, 25, 27 and 28 of J1 and then fed to correspondingly numbered terminals in the control panel multiplexer 162.

To drive the seven segment display associated with the weight indicator 44 (FIG. 2) the signals for energizing that display are received at terminals 8, 10, 12 and 16 of J1 from the control panel multiplexer 164, passed through drivers 310 and thence to terminals 5-8 of J3.

Terminals 8, 10, 12 and 16 of J1 also receive signals for illuminating the various lights on the front panel 34. These signals also pass through the drivers 310 and thence to the illustrated inputs of latches 312, 314, 316, 318, 320 and 322.

Strobe signals are applied to the strobe inputs of the latches 312-322 from drivers 308. When strobed, a latch generates a signal for turning on one of the transistors 324-346. For example, when the latch 312 is strobed, the transistor 324 is turned on to illuminate the repeat label switch 68 (FIG. 2) via terminal 12 of J3. Terminals 15 and 16 of J3 illuminate the auto price light 38 and the manual price light 48, respectively. Terminals 3, 4, 6, 7, 9–11, and 15 of J2 are connected to illuminate, respectively, the following: low label light 64, tare label light 62, digital tare light 72, auto tare button 40, a minus sign (not shown) on the weight indicator 44, error price light 58, and error commodity light 60.

Figure 12:
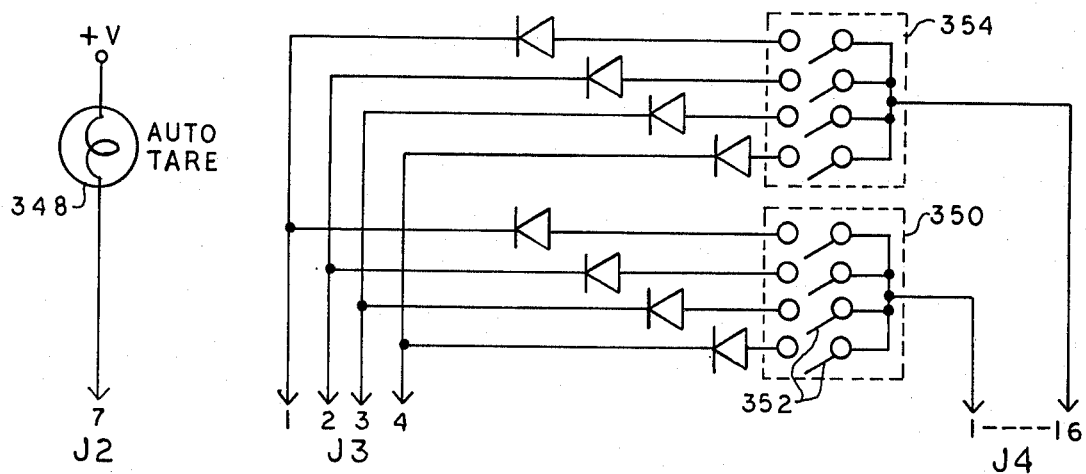
FIG. 12 is a schematic representation of the switching circuitry associated with the control panel of FIG. 7.

FIG. 12 is a schematic representation of the way in which the various lights and switches on the front panel 34 are energized and addressed. By way of example, a lamp 348 is shown for illuminating the auto tare button 40. When an energizing signal is received from the control panel interface 164 via terminal 7 of J2, the lamp 348 is energized. The other lights and illuminated switches are energized in the same manner.

The various thumbwheel switches on the front panel 34 are preferably four bit binary switches. Each switch is addressed by signals received from the control panel multiplexer 164 via terminals 1–16 of J4. For example, when an addressing signal is received at terminal 1 of J4, the switch 350 is energized for determining the open or closed condition of its internal contacts 352. The condition of those contacts is sensed at terminals 1–4 of J3 which are connected to correspondingly numbered terminals in the control panel interface 164.

It will be understood that the representation of switch 350 is very schematic and is intended to be merely representative of the type of four bit binary switch which is well known in the art.

Another switch 354 is shown and is energized by an address signal received at terminal 16 of J4. The status of its contacts is also sensed through terminals 1–4 of J3. Although they are not shown as such in FIG. 12, it is understood that there is a switch similar to switches 352 or 354 for each of the terminals 1–16 of J4.

Figure 13:
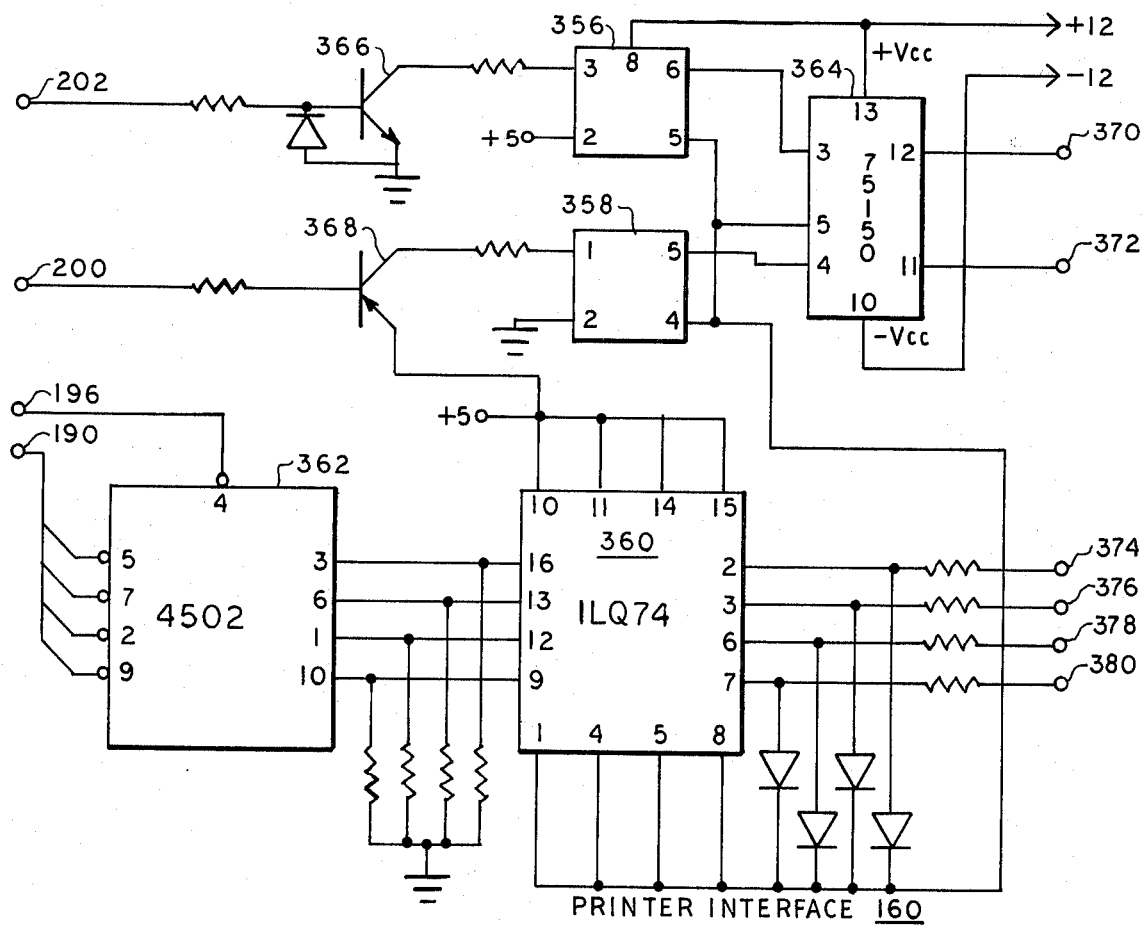
FIG. 13 is an exemplary circuit diagram of the printer interface illustrated in FIG. 7.

Turning now to FIG. 13, there is shown a detailed circuit diagram of the printer interface 160. Its major components include optical isolators 356, 358 and 360, a transmission gate 362, a driver 364, and transistors 366 and 368. Data is received from the computer 136 at terminals 200 and 202, passed through transistors 366 and 368, isolators 356 and 358, driver 364 and then to the printer 20 via terminals 370 and 372. Specifically, terminal 372 provides the printer 20 with a print command signal and terminal 370 provides the printer with the data to be printed in serial form and is A.S.C.I.I. coded.

Input signals from the printer are received at terminals 374–380, passed through the isolator 360 and to the transmission gate 362. The latter sends those signals to the computer 136 via terminal 190 upon receipt of a low level signal at terminal 196. The signals received at the terminals 374–380 include a take label signal, a low label signal, an error signal, and a printer ready signal.

Having described the illustrated exemplary circuitry, the way in which the computer 136 interacts with the encode price switch 50 will now be described in further detail. The switch 50 may be a single pole, normally open switch which is closed by the turning of a key. Periodically, the computer ascertains the condition of the switch 50 by causing the control panel multiplexer 162 to put an interrogating signal on terminal 40 of J1 (FIG. 10). After passing through the control panel interface 164, that signal is connected in series with the switch 50 and an isolating diode (not shown). If the switch 50 is closed, the interrogating signal passes through the switch 50 and the isolating diode to the terminal 27 of J1 (FIG. 10). The interrogating signal passes through the level shifter 302 to the transmission gate 304, the latter of which couples the interrogating signal to the computer 136 when a low level signal is received at terminal 204. The receipt of the interrogating signal indicates to the computer that the switch 50 is closed and that a new unit price is to be encoded on the product card.

Next, the computer examines the signal on terminal 242 to determine if the card reader head is in its home position, i.e., at the beginning of the magnetic strip. If the signal on terminal 242 indicates that the head is elsewhere, the computer 136 waits until the reader head reaches its home position. The computer also puts the new unit price information in its memory.

Next, the computer causes a signal to be placed on terminal 238 (FIG. 9) to turn on the card reader's motor and also causes integrated circuit 234 to develop signals at its pin 10 and 11 to put the card reader in its read mode for reading the track on which the unit price is encoded (track 2 in the example shown in FIG. 5).

As the card reader head reads the information encoded on the magnetic stripe, the computer monitors the characters being read until it recognizes the price start character 128, whereupon the computer places the card reader in its write mode and transmits to the card reader the new unit price data for encoding thereof on the magnetic stripe. The encoding of the new unit price information simultaneously erases the old unit price information. In addition, the computer transmits price start character 128 and price end character 132 to the card reader so that those characters will, when encoded, bracket the newly encoded unit price. This enables the card reader to accurately locate the newly encoded unit price on subsequent scanning in case the newly encoded unit price is written other than precisely over the old unit price.

With the new unit price encoded, the computer 126 places the card reader 140 in the read mode and causes the card reader 140 to scan and read all the information on the product card. This enables the computer 136 to verify that the new unit price was encoded correctly.

From the disclosure above, it can be appreciated that the invention provides for extremely simple and reliable storing of product information and for supplying a label printer with the stored information as well as the calculated price of a product. The fact that the unit price information is easily changed on the product card greatly enhances the versatility of the system. Moreover, the way in which the U.P.C. code is stored and printed with a check digit in machine-readable form in essentially a one step operation is very desirable.

The illustrated embodiment has been described in terms of a label printer which has a memory in which certain fixed information is stored. For example, store name, department name, etc., are stored in a memory in the printer. However, this invention permits use with a universal printer which will accept variable information. With such a printer, a program card having a computer program stored on it (or the address of a program stored in the computer or control parameters of a program stored in the computer) can be inserted into the card reader. The program card may be of the same type as the product card described above, i.e., with one or more magnetic stripes thereon. When the program card is read, the computer is thereby programmed to cause a specific weighing and printing function to be effected, as for example, causing the printer to print a label of a specific length or with store and department information, etc. Such information is referred to herein as "logo" information.

After using the program card once, the various product cards can be used as described above. Thus, only the program card, a relatively inexpensive item, need be changed in order to use the sysem in other stores or departments of a store. This feature further enhances the flexibility of the system.

Although the invention has been described in terms of preferred structure and its use, it will be obvious to those skilled in the art that many modifications and alterations may be made without departing from the spirit and scope of the invention. For example, various types of card readers may be used in place of the one described, such as the type in which the product card is moved manually past a read/write head. Accordingly, it is intended that all such modifications and alterations be included within the spirit and scope of the invention as defined by the appended claims.

PROGRAM LISTING
DATA FORMAT

1. All data is hexadecimal.
2. The first 3 characters of each line indicate the starting address in memory for the data contained on the line.
3. The next 2 characters of each line specify the number of characters of data which are printed on the line.
4. Subsequent characters in the line up to but not including the last two characters are the actual data content.
5. The last two characters in each line represent a checksum of the data in the line for error detection purposes.

```
PROGRAM ID: UPC020
0003C543E53F6543B543F220B23E9F5F51A0054841C0054892A27DC537CE454387A
01E3C220423E9F5D01A27D96323E06323E026002A212C21DA54A2ECF2FB1A1B54CF
03C3C3E2C0B549454801448D14057241625E9F61C562C305494D24057D4241C256F
05A3CE0241D25E9F61275543B220B23E9F51A6128EE2A13DE5394D440C522002333A
0783CE9F61A7E41B6D025E02A225475BE26222A3B2C220B54B1202521E9F51AA0F1
0963C28222A10DC5455D140C028222A102C0CDC54B12A0C547514B92C222A105425
0B43C9623E740C02A1054751 4C0D4BEF6BEF3F5241925E0543B220823E9F61AD793
0D23C5379D84122F612E5543E220023E9F512E5410028222A3B2C3B54A12A3B54A5
0F00C7514F4D2412282
1003C24JF25E9141753792A3B25E92BF1FBE0F76B2BE0D44122241A25E9F6F61290
11E3C265379D1241A25E0543E220023E9F5F51A3654691A3644DA23E9F6F61A3E7B
13C3C41B6543423EAF5F553F62418251A4EE04153E91C534285543E220023E9F6D1
15A3C1A5E419C543B220623E91C66EE14872E4025EEF1F5E6F5F5001A8253E6E93C
1783CF61A822FD1E1543F7F7B2FD0E123E6241925E9F512AA53E8129442EC25E902
1963CF5D0F6E04016DE2419546C126E241D25D1E0416E54801 48EEEF6128E23EF5E
1B43C1C6E53E823E4E51A8E25E9F512C4457B280E534E2A1054714D52419DE5444
1D23C6C1AD745E62C172A275380ABF21CDB53A42C132A275380ABF21CE753A453C7
1F03CE61AF6D442ECD62A00537C2C142A0754962C10549620C022072A002C0028D3
20E3C0B23E0F61A1EE0A1B8A1BDDB54A2420D616370 1C2A2FDC537C2801F129E961
22C3C1433F6F51233F5692A282C01DB54A3220523E91443401454CD2A012EADF01D
24A3C54C2E9EBFBF12A02BFDDBF54C527EC2BF1EBFBBEF19EF1FB2A002BE02C052A
2663C2A2BDABE53807E6C2A2B53AA53E1E9F5F5127D42EC25EEF2E623E740162530
2663CD2E4D8E5557112F7D85435557 11A9154352C9B54192C0D2A4F5423557112D2
2A43CA1D6543555711AA8D454352C1C54192C835423536C540053CE12F727A9E4D3
2C23C25D5E42C9D541987540053CE12F72C0453C214DC27A9E06742CA54731CE367
2E03AD942E4D1241825E053F64016E9F6F6D11AF3D225E0401625EDB5EC42E56A
3003C4A414E4645424D4152415052 4D41594A554E4A554C41554753455 04F4354D3
31E3C4E4F564445432A2F2DE9200 0BFAFF18F1A3260F18FB1F7S0B0DDBE3E536CF2
33C3C713F607E396D2A272DE9F5126F53865386C0A6F5F1F6B823ECF189E4EDS5C1
35A3CE5F0E1DCBFA6F6B9F6B6F7E10000A9F6B6F6B9F7E17F5F00000000001E19C
3783CC02A3FDD2630439 42DADF5BD43662D6DE9B9D3B6DF4394 2A2F2820D68FA9BD
3963C2BE0ABF6B8A52BE0ABF6BB7F95C02A2743AA2A2F53B853C214CD534EABF62A
3B43CBB1CAAC02BE9B9ABF6B52BE9B6C0ACF1961CCDF14D991CCDC0CF2E1CA6530A
3D23CDABFA953DAAEF6C0F61ADE6E7FDACC23ECB92621 5353D527E22324 1EEAF42F
3F01425E2F5241BC05434E2C023
4003C0BEF23EAF5F5121 71906EAF6A6F6B6A9F6B9111 27F02C042F72800DF54015F
41E3C53021C1BC0540353CE121753C21422538C12236A4423D425E227D4E2C2D224
43C3C443FD12200241026J872020A321E225E9E2A727E22365EAE0D027E2734823
45A3CC2BFFAF929ESF1FB2BE0696B7F5DC0DF24185F25E9F67F6FC02A30DC5F2B95
4783CE9 1C7F6B7F77CCCF2A1444752A80B44762A8026005337BBD7A6DC02A14AF
4963C02BF2DE92BE06D6B7F95C0DCF1BF29E92BEBFB2DE0696B6D7FA4C0BFFAF9FD
4843C2BE329F1EBF62DE0696B5D7FB3C02B6B6BE3FBF17FC22BE0C02A012E0C23C7
4D23CEB6B7FD1FB2BE0C0241D25D2E3D6E7D4E4DD55571 12E52A2F2800536C5328
4F03C6C2B9D533C2C0BDCBE53567EF92604536C2B2B53B853CE1A0EE9F5F3F6E0AC
```

```
5CE3CABF8B81C330C54352C1C54192C83555D2C1F54192A2F53B85538A2F8B31C19
52C3C2453F6241D25E05469E04016D8BF453E113CA8F688A9F6B9194400005555C2
54A3C114A194C1A5255557F3CC025EFF6F3F5E2E7C0540053CE126853C21C5DC009
5653C4CF72C007C6C7D6DC0543423EAF5F51268F5C0241825E9F61ABF53E6128893
586CC42EC23E4E5543E2802534E538F534E53E81A9B42EC2C01532453A8536F53EC
5A43C4E0C8E53367EA753A8538F534E532453A82C632A4F53AA1CC27AB9D242E404
5C21853E1C9F5F512C842ECD842F31F
5C234C9544340290E20C9E36534E617FEA536F53A42C142A01549 6424320
9FC0050
```

What is claimed is:

1. An automatic weighing, computing and printing scale adapted for use with a product card having magnetically encoded thereon information including product description and product unit price comprising:
- a card reader for automatically scanning the product card and reading the encoded information thereon including the product description and the product unit price;
- scale weighing mechanism for weighing a product to develop a total product weight;
- a computer including storage means for receiving and storing said product description and said product unit price and said total product weight information, and calculating means for calculating from said product unit price and said total product weight information a total product price, and controller means for selectively transmitting information stored therein; and
- a label printer for receiving from said computer said product description and said total product price information for printing said product description and said total product price information on a label in machine readable form.

2. The automatic weighing, computing and printing scale as set forth in claim 1 wherein the label printer is also adapted to print said product description and said total product price in alpha-numeric form and wherein the information printed on the label in machine readable form conforms to the format of the uniform product code.

3. An automatic weighing, computing and printing scale including in combination:
- a product card having product information magnetically stored thereon including product description and product unit price;
- a card reader for automatically scanning the product card and reading the encoded information thereon including the product description and the product unit price;
- a scale weighing mechanism for weighing a product to develop a total product weight;
- manually operative unit price switches;
- a computer including a storage means, a calculating means and means responsive to the operation of said product unit price switches to store the product information therein in the storage means, wherein upon actuation said computer
  - (a) operates said card reader for reading the encoded information on the product card and thereafter operates said scale weighing mechanism to provide a total product weight, and
  - (b) stores said product description, total product weight information, and said unit price information read from the product card when the product unit price switches are not actuated, and
  - (c) calculates a total product price, and
  - (d) transmits said product description and said total product price information to a label printer; and
- a label printer for receiving from said computer said product description and said total produce price information for printing thereof on a label, whereby the calculated total product price printed by said label printer is determined by said manually operative product unit price switches, when actuated, and by the product unit price read from the product card when the product unit price switches are not actuated.

4. An automatic weighing, computing and printing scale including in combination:
- a product card having erasable product information magnetically stored thereon including product description and product unit price;
- a card reader for automatically scanning the product card and reading the encoded information thereon including the product description and the product unit price, said card reader being selectively operative from a read mode for reading the product information on said product card into a write mode for erasing previously recorded unit price information and for recording new unit price information onto said product card;
- a scale weighing mechanism for weighing a product to develop a total product weight;
- a computer including a storage means and a calculating means wherein upon actuation said computer
  - (a) operates said card reader for reading the encoded information on the product card and thereafter operates said scale weighing mechanism to provide a total product weight, and
  - (b) stores said product description and said product unit price and said total product weight information, and
  - (c) calculates a total product price, and
  - (d) transmits said product description and said total product price information to a label printer; and
- a label printer for receiving from said computer said product description and said total product price information for printing thereof on a label.

5. The automatic weighing, computing and printing scale as set forth in claim 4 in further combination with manually operative unit price switches; and
- wherein said computer includes means responsive to the operation of said switches to store the unit price information thereof in the storage means and to operate said card reader into said write mode for recording the unit price information therein on said product card.

6. An automatic weighing, computing and printing scale including in combination:
- a product card having product information magnetically stored thereon including product description and product unit price;
- a card reader selectively operative into a read mode for reading the product information on said product card and operative into a write mode for recording product information onto said product card;
- manually operative product unit price switches;
- an encoding switch;
- a scale weighing mechanism for weighing a product to develop a total product weight;
- a computer including a storage means, a calculating means, and means responsive to the operation of said product unit price switches to store the product unit price information thereof in the storage means, and wherein, upon actuation, said computer
  - (a) operates said card reader for reading the coded information on the product card and thereafter operates said scale weighing mechanism to provide a total product weight, and
  - (b) stores said product description, total product weight information, and said unit price information read from the product card when the product unit price switches are not actuated, and
  - (c) calculates a total product price, and
  - (d) transmits said product description and said total product price information to a label printer, and
  - (e) responsive to the operation of said encoding switch operates said card reader into said write mode for recording the product unit price information therein on said product card and to operate said card reader into said read mode to compare and verify that the product unit price information recorded on said product card is the same as the product unit price information in the storage means; and
- a label printer for receiving from said computer said product description and said total product price for printing thereof on a label.

7. An automatic weighing, computing and printing scale including in combination:
- a product card having product information magnetically stored thereon including product description and product unit price;
- a card reader selectively operative into a read mode for reading the product information on said product card and operative into a write mode for recording product information onto said product card;
- manually operative product unit price switches;
- an encoding switch;
- a scale weighing mechanism for weighing product to develop a total product weight;
- a computer including a storage means and a calculating means wherein, upon actuation, said computer
  - (a) operates said card reader for reading the coded information on the product card and thereafter operates said scale weighing mechanism to provide a total product weight, and
  - (b) stores said product description and said product unit price and said total product weight information, and
  - (c) calculates a total product price, and
  - (d) transmits said product description and said total product price information to a label printer, and
  - (e) responsive to the operation of said product unit price switches stores the product unit price information therein in the storage means and responsive to the operation of said encoding switch operates said card reader into said write mode for recording the product unit price information on said product card; and
- a label printer for receiving from said computer said product description and said total product price for printing thereof on a label, said label printer being adapted to print said product description and said total product price information on a label in alphanumeric form and in machine readable form conforming to the format of the uniform product code.

8. The automatic weighing, computing and printing scale as set forth in claim 7 wherein said computer is operative to produce a final check digit in conformance with the format of the uniform product code and from said product description and said total product price information and to transmit said final check digit information to said label printer.

* * * * *